June 10, 1969     M. S. BLOOM ET AL     3,449,145
SPRAYING PLASTIC COATINGS ONTO BUILDING BOARDS OR THE LIKE
Filed Aug. 3, 1964
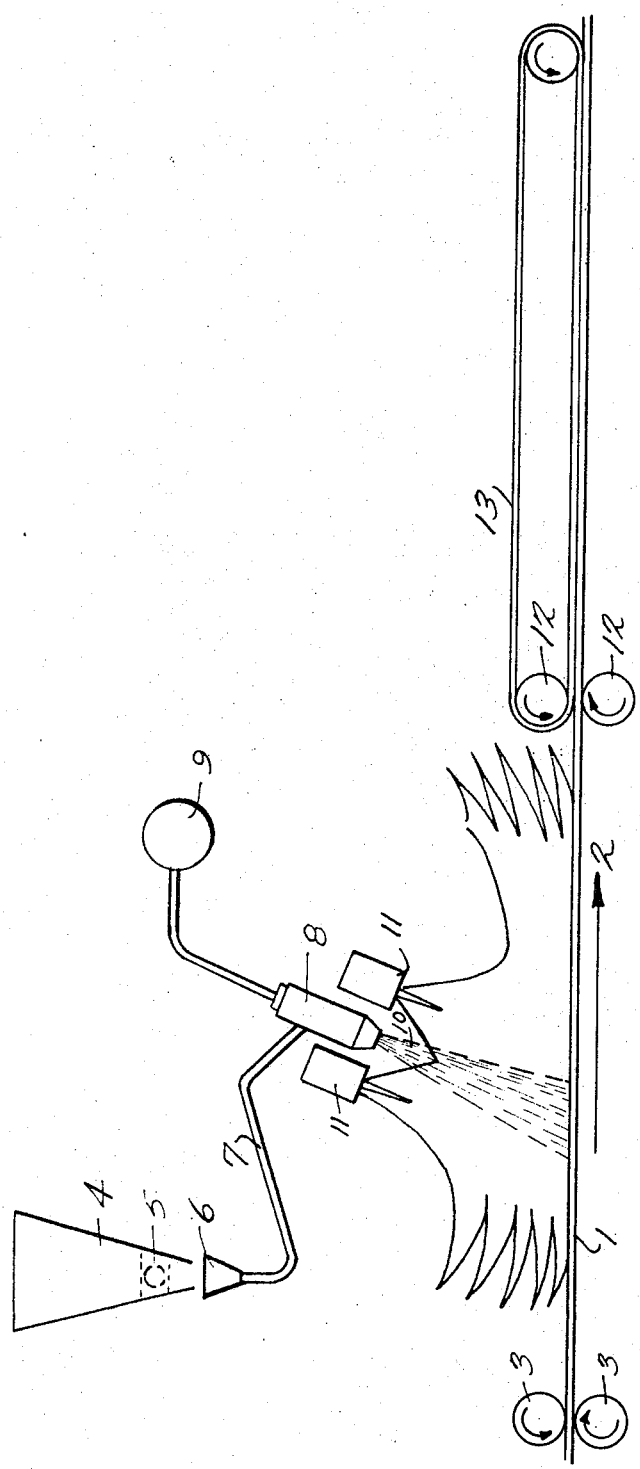
INVENTORS
MARTIN S. BLOOM
ALBERT EDWARD RILEY
BY Cushman, Darby & Cushman
ATTORNEYS

United States Patent Office 3,449,145
Patented June 10, 1969

3,449,145
SPRAYING PLASTIC COATINGS ONTO
BUILDING BOARDS OR THE LIKE
Martin S. Bloom and Albert Edward Riley, Norton-on-Tees, England, assignors to Imperial Chemical Industries Limited, London, England, a corporation of Great Britain
Filed Aug. 3, 1964, Ser. No. 387,160
Claims priority, application Great Britain, Aug. 6, 1963, 30,973/63
Int. Cl. B44d 1/095, 1/09; B05c 5/02
U.C. Cl. 117—21        4 Claims

ABSTRACT OF THE DISCLOSURE

A method for coating the surface of plasterboard or wood such as plywood by spraying the surface with powdered thermoplastic material selected from the group consisting of non-atactic polypropylene, polyethylene or nylon from a hot gas spray gun. Before the powder has had time to cool the sprayed surface is passed between resilient pressure rollers to cause fusion of the thermoplastic particles and adhesion to the surface and causing the resulting coating to set. A strippable molding surface is interposed between the pressure rollers and the sprayed surface and is stripped off after the thermoplastic coating has set. The spraying conditions, including particle size, gas temperature and residence time, are such that at no time in their flight from the sprayer to the base to be coated do the particles ever attain a temperature as high as their melting point.

---

This invention relates to articles coated with synthetic thermoplastic materials and to processess for coating articles therewith.

In one embodiment, the invention provides an article having at least one surface thereof provided with a coating consisting of a continuous film pressure-formed on said surface from a powdered synthetic thermoplastic material. In preferred embodiments of the invention, the said synthetic thermoplastic material is selected from the group consisting of non-atactic polypropylene, polyethylene and nylon.

The invention is particularly, though not exclusively, applicable to the coating of constructional elements such as building boards, in particular plasterboard, which comprises a plaster core cast or formed in a paper jacket or former which then becomes an integral part of the plaster core material, imparting to the board desirable bending and tensile properties which it would not otherwise possess. The moisture permeability of the paper jacket or former is very high during manufacture, and it is a principal object of the invention, after drying the rigid plasterboard, to apply thereto a thin coating of a synthetic thermoplastic material (in particular a polypropylene such as isotactic polypropylene) so as to provide it with a desirable waterproof, decorative and/or mechanical surface.

It is not practicable, for example, to melt polypropylene and then spray it onto the board in the molten condition since it tends to degrade at temperatures somewhat above its softening temperature where fusion would be feasible, thereby causing embrittlement and cracking of the coating. Nor is it practicable to spread the thermoplastic material onto plywood or plasterboard and fuse it in situ thereon, for example by means of a direct flame, since plywood and plasterboard will scorch at suitable application temperatures; in the case of plasterboard, furthermore, the water of hydration of the plaster core tends to be expelled at such temperatures, thereby causing blistering of the surface.

These difficulties are overcome by the present invention which provides, in another embodiment, a process for coating a surface with a synthetic thermoplastic material which comprises the steps of spraying the surface with the material in the form of a powder from spraying means, softening the powder by heating it between said spraying means and the surface and, before the thermoplastic material has had time to cool, applying pressure to the sprayed surface so as to cause fusion of the thermoplastic particles and adhesion to the surface.

In another embodiment, the invention provides a process for coating a surface with a synthetic thermoplastic material selected from the group consisting of non-atactic polypropylene, polyethylene and nylon, which comprises the steps of spraying the surface with the material in the form of a powder from at least one hot gas spray gun, passing the sprayed surface, before the thermoplastic material has had time to cool, between resilient pressure rollers, so as to cause fusion of the thermoplastic particles and adhesion to the surface, applying a strippable moulding surface to the sprayed surface, and stripping off said moulding surface after the thermoplastic coating has set.

The processes of the invention are equally applicable to the coating of the edges, as well as the main surfaces, of boards or like articles.

In order to obtain a sufficiently high rolling pressure without damaging brittle materials or articles being sprayed, it is desirable to employ resilient rollers, for example rubber rollers. The rollers are conveniently hydraulically- or spring-loaded so as to provide an adjustable and accurate degree of control over the rolling pressure.

The coating is preferably caused to set by applying thereto a strippable moulding surface, for example a cool polytetrafluoroethylene sheet, such as a "Fluon" (registered trade mark) sheet, or a sheet of material coated therewith, which is conveniently interposed between the rollers and the sprayed surface, and which imparts surface character thereto; this moulding surface is stripped off after the set of the thermoplastic coating.

The thermoplastic material is conveniently sprayed onto a continuously moving surface by one or more hot gas spray guns which soften the material in flight only sufficiently to cause it to flow and fuse into a continuous film under the rolling pressure and bond to the substrata; for edge coating softening adequate for adhesion of the particles to the surface is required. The powdered thermoplastic material in flight from the hot spray gun to the surface being coated is not heated above its melting point. In the case of polypropylene, this temperature may suitably be about 160° C. Substantially instantaneous application of pressure to the softened thermoplastic material causes the particles to merge into one another, wetting and penetrating the surface and flowing into imperfections therein, thereby producing a smooth and even coating which may be, for example of the order of as little as two-thousandths of an inch in thickness.

The accompanying drawing illustrates schematically a suitable arrangement for coating plasterboard with synthetic thermoplastic materials in accordance with the invention.

The board 1 to be coated is continuously propelled in the direction of the arrow 2 by a pair of conventional feed rollers 3. The thermoplastic coating material is fed continuously, in powdered form, into a powder hopper 4 which extends across substantially the whole width of the board 1 and which is provided with means, for example a metering roller 5, for accurately metering desired quantities of powder into a plurality of collecting funnels 6 which are located side by side across the whole width of the board 1, and each of which is connected by a feed pipe 7 to a powder ejector 8. The powder ejectors 8 are likewise situated side by side across the whole width of the board and are connected to a common compressed air manifold 9 which causes the powdered coating material to be ejected from the powder ejectors 8 in the form of a spray 10. Adjacent collecting funnels 6 and adjacent powder ejectors 8 are located sufficiently close to one another to ensure that the sprays 10 direct the powdered coating material evenly across the whole width of the board 1. A number of burners 11 situated adjacent to the powder ejectors 8 provide streams of hot gas which heat the powder contained in the jets 10 so that it strikes the board 1 in a partially-softened condition.

The board, with the partially softened thermoplastic material spread over it substantially evenly is then passed between a pair of pressure rollers 12, which are conveniently of rubber, which cause the thermoplastic particles to flow and fuse into a continuous film which is caused to set by further passing the board in contact with an endless fibre-glass belt 13 coated with polytetrafluoroethylene.

In carrying out the present invention, a number of variable factors are involved, any or each of which may be adjusted to suit the material being coated and the desired thickness of the coating. Such variable factors include:

(1) The rate at which the thermoplastic is supplied (for example by metering) to the powder ejectors;
(2) The temperature of the hot gas;
(3) The distance of the surface from the powder ejectors;
(4) The velocity at which the thermoplastic material is sprayed from the powder ejectors;
(5) The temperature of the thermoplastic material when it reaches the surface (which depends in part on factors (2) to (4) above);
(6) The temperature of the surface when it is reached by the thermoplastic material (which depends in part on factors (2) and (3) above);
(7) The speed at which the surface is travelling, which may be, for example, of the order of 100 ft./min.
(8) The pressure exerted by the rollers;
(9) The duration of time for which the strippable moulding surface, e.g. the "Fluon" (registered trade mark) sheet, is applied to the surface, which is dependent, in some degree, on all the foregoing factors (1) to (8) above, and itself determines the length of the said strippable moulding surface.

Further decorative effects may be obtained by using dyed or otherwise decorated materials or articles for spraying, and/or pigmented thermoplastic material. We have found, for example that about 3% by weight of carbon black, or about 10% by weight of titanium dioxide, is sufficient, and gives a dense pigmentation in coatings 0.005" thick. The pigment and thermoplastic materials may be mixed and sprayed together in the powdered state.

It has further been found that the addition of ultraviolet stabilisers to the themoplastic material prolongs the life of the coating almost indefinitely.

The invention has been described hereinabove with particular reference to the coating of building boards (e.g. plasterboard) but it is equally applicable, as stated hereinabove, to articles made of other materials such as wood (for example, plywood), metals (for example, steel plate and tin plate), glass and ceramics. The invention particularly relates to articles in the form of straight panels, boards or sheets (whether continuous or discontinuous), but they may also have curved (for example cylindrical) surfaces. The articles may have plane surfaces, or they may have shaped surfaces, for example, corrugated, grooved or channelled surfaces, provided the pressure-rollers 12 are provided with corresponding corrugations, grooves or channels.

We claim:

1. A process for coating a surface of a material selected from the group consisting of plasterboard and wood with a powdered thermoplastic material selected from the group consisting of non-atactic polypropylene, polyethylene and nylon comprising hot gas spraying said powdered thermoplastic material from a hot gas spray gun onto said surface so that said powdered thermoplastic material is in a heated softened condition on said surface, said powdered thermoplastic material in flight from said hot spray gun to said surface being heated below the melting point of said thermoplastic material but being heated sufficiently to soften the same to cause it to flow and fuse into a continuous film under pressure, passing the resulting sprayed surface before said powdered thermoplastic material cools between resilient pressure rollers so as to cause fusion of the powdered thermoplastic material and adhesion thereof to said surface, interposing strippable molding means between said sprayed surface and said pressure rollers so that said strippable molding means is in intimate contact with said sprayed surface, advancing said strippable molding means while in contact with said sprayed surface for a time sufficient to set said coating and removing said trippable molding surface from said set coating.

2. The process according to claim 1 wherein said strippable molding means comprises a sheet whose thermoplastic material coating contacting surface is polytetrafluoroethylene.

3. The process according to claim 1 wherein said resilient pressure rollers are hydraulically-loaded so a to provide adjustable and accurate control over the rolling pressure.

4. The process according to claim 1 wherein said resilient pressure rollers are spring-loaded so as to provide adjustable and accurate control over the rolling pressure.

References Cited

UNITED STATES PATENTS

| | | | |
|---|---|---|---|
| 2,227,494 | 1/1941 | Gold | 117—64 |
| 2,330,333 | 9/1943 | Brubaker | 117—105.2 |
| 2,410,225 | 10/1946 | Macht et al. | 117—65.2 |
| 2,859,482 | 11/1958 | Warren et al. | 117—65.2 |
| 3,112,211 | 11/1963 | Ward | 117—105.2 |
| 3,157,528 | 11/1964 | Strahl | 117—64 |

FOREIGN PATENTS

| | | |
|---|---|---|
| 638,136 | 3/1962 | Canada. |
| 551,339 | 2/1943 | Great Britain. |
| 1,339,840 | 9/1963 | France. |

ALFRED L. LEAVITT, *Primary Examiner.*

J. H. NEWSOME, *Assistant Examiner.*

U.S. Cl. X.R.

117—46, 64, 65.2, 105.2, 148, 155, 161